US012801567B2

(12) United States Patent
Luo et al.

(10) Patent No.: US 12,801,567 B2
(45) Date of Patent: Nov. 17, 2026

(54) CHANGE BLOCK TRACKING FOR TRANSFER OF DATA FOR BACKUPS

(71) Applicant: Rubrik, Inc., Palo Alto, CA (US)

(72) Inventors: Jiangbin Luo, Cupertino, CA (US); Lei Shi, Santa Clara, CA (US)

(73) Assignee: Rubrik, Inc., Palo Alto, CA (US)

( * ) Notice: Subject to any disclaimer, the term of this patent is extended or adjusted under 35 U.S.C. 154(b) by 150 days.

(21) Appl. No.: 18/097,218

(22) Filed: Jan. 14, 2023

(65) Prior Publication Data

US 2023/0161733 A1 May 25, 2023

Related U.S. Application Data

(63) Continuation of application No. 16/041,697, filed on Jul. 20, 2018, now Pat. No. 11,573,922.

(51) Int. Cl.

| | |
|---|---|
| ***G06F 16/10*** | (2019.01) |
| ***G06F 11/1446*** | (2026.01) |
| ***G06F 16/11*** | (2019.01) |
| ***G06F 16/182*** | (2019.01) |
| ***G06F 16/901*** | (2019.01) |

(52) U.S. Cl.

CPC ........ *G06F 16/128* (2019.01); *G06F 11/1451* (2013.01); *G06F 11/1464* (2013.01); *G06F 16/122* (2019.01); *G06F 16/182* (2019.01); *G06F 16/9024* (2019.01); *G06F 2201/84* (2013.01)

(58) Field of Classification Search

CPC ............... G06F 16/128; G06F 11/1451; G06F 11/1464; G06F 16/122; G06F 16/182; G06F 16/9024; G06F 2201/84; G06F 2201/815; G06F 11/3034

See application file for complete search history.

(56) References Cited

U.S. PATENT DOCUMENTS

| | | | | |
|---|---|---|---|---|
| 5,497,483 | A | 3/1996 | Beardsley et al. | |
| 6,748,504 | B2 * | 6/2004 | Sawdon | G06F 3/067 714/E11.122 |
| 7,296,125 | B2 * | 11/2007 | Ohran | G06F 11/1451 714/E11.123 |
| 7,702,670 | B1 | 4/2010 | Duprey et al. | |
| 8,117,410 | B2 * | 2/2012 | Lu | G06F 11/1451 707/672 |
| 8,452,932 | B2 * | 5/2013 | Pangal | G06F 11/1453 711/E12.103 |
| 8,694,700 | B1 * | 4/2014 | Natanzon | G06F 3/067 710/52 |
| 8,712,970 | B1 | 4/2014 | Sim-Tang | |

(Continued)

OTHER PUBLICATIONS

U.S. Appl. No. 16/041,697, filed Jul. 20, 2018, Issued, U.S. Pat. No. 11,573,922.

*Primary Examiner* — Belix M Ortiz Ditren
(74) *Attorney, Agent, or Firm* — Holland & Hart LLP

(57) ABSTRACT

In one approach, a set of data blocks or files is tracked for changes between snapshots. This may be done by a file system filter running in kernel mode. The data blocks or files that are tagged as unchanged are not transferred to backup because there is no need to update since the last backup. Other data blocks and files may be first tested for change, for example by comparing digital fingerprints of the current data versus the previously backed up data, before transferring to backup.

20 Claims, 9 Drawing Sheets

(56) References Cited

U.S. PATENT DOCUMENTS

| | | | | |
|---|---|---|---|---|
| 8,832,027 | B1 * | 9/2014 | Bushman | G06F 11/1451 707/646 |
| 9,176,853 | B2 * | 11/2015 | Narayanan | G06F 12/16 |
| 9,323,750 | B2 * | 4/2016 | Natanzon | G06F 11/2074 |
| 9,348,827 | B1 * | 5/2016 | Patwardhan | G06F 11/1451 |
| 9,372,758 | B2 * | 6/2016 | Ashutosh | G06F 11/1456 |
| 11,086,545 | B1 * | 8/2021 | Dayal | G06F 3/067 |
| 11,573,922 | B2 | 2/2023 | Luo et al. | |
| 2005/0251540 | A1 * | 11/2005 | Sim-Tang | G06F 11/1471 |
| 2009/0313503 | A1 | 12/2009 | Atluri et al. | |
| 2010/0077165 | A1 * | 3/2010 | Lu | G06F 11/1451 711/E12.001 |
| 2010/0198788 | A1 * | 8/2010 | Sim-Tang | G06F 16/178 707/634 |
| 2013/0238559 | A1 | 9/2013 | Bushman | |
| 2013/0290262 | A1 * | 10/2013 | Yazawa | G06F 16/21 707/649 |
| 2015/0143063 | A1 | 5/2015 | Mutalik et al. | |
| 2015/0179284 | A1 * | 6/2015 | Alrod | G06F 11/076 714/704 |
| 2016/0147607 | A1 | 5/2016 | Dornemann et al. | |
| 2016/0148645 | A1 * | 5/2016 | Zhu | G11B 20/1217 360/48 |
| 2016/0306709 | A1 | 10/2016 | Shaull | |
| 2020/0243107 | A1 * | 7/2020 | Ng | G11B 5/5534 |

* cited by examiner

Service Schedule 222

| machine_user_id | machine_id | SLA |
|---|---|---|
| VM01 | m001 | standard VM |
| VM02 | m002 | standard VM |
| PM04 | m003 | standard PM |
| VM07 | m004 | high frequency |
| PM01 | m005 | short life |
| | . . . | |

FIG. 3A

Job Queue 224

| job_id | start_time | job_type | job_info |
|---|---|---|---|
| 00001 | 0600 | pull snapshot | target = m001 |
| 00002 | 0600 | pull snapshot | target = m005 |
| 00003 | 0610 | replicate | target = m003 |
| 00004 | 0615 | run analytics | target = m002 |
| 00005 | 0615 | trash collection | xxx |
| . . . | | | |

FIG. 3B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | . . . |
| . . . | | |

Image Table 228

| im_id | im_location |
|---|---|
| m001.im1 | . . . |
| m001.im1-2 | |
| m001.im2-3 | |
| m001.im3-4 | |
| m001.im4-5 | |
| . . . | |

FIG. 3C

CHANGE BLOCK TRACKING FOR TRANSFER OF DATA FOR BACKUPS

CROSS REFERENCE TO RELATED APPLICATIONS

This application is a continuation of U.S. patent application Ser. No. 16/041,697 by Luo et al., entitled "Change Block Tracking for Transfer of Data for Backups," filed Jul. 20, 2018, which are hereby incorporated in its entirety by reference herein.

BACKGROUND

1. Technical Field

The present invention generally relates to managing and storing data, for example for backup purposes.

2. Background Information

The amount and type of data that is collected, analyzed and stored is increasing rapidly over time. The compute infrastructure used to handle this data is also becoming more complex, with more processing power and more portability. As a result, data management and storage is increasingly important. One aspect of this is reliable data backup and storage, and fast data recovery in cases of failure.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically also includes backup and retrieval of the virtual machines, in addition to just the application data.

As the amount of data to be backed up and recovered increases, there is a need for better approaches to transfer only the data needed to make a backup.

SUMMARY

In one approach, a set of data blocks or files is tracked for changes between snapshots. This may be done by a file system filter running in kernel mode. The data blocks or files that are tagged as unchanged are not transferred to backup because there is no need to update since the last backup. In one approach, the tracking session starts before the last snapshot and end after the current snapshot. In this way, the tracking session will capture all changes that happen between snapshots but it may be overinclusive. That is, data blocks may be tagged as changed when they are actually unchanged. As a result, the other data blocks and files may be first tested for change, for example by comparing digital fingerprints of the current data versus the previously backed up data, before transferring to backup.

Other aspects include components, devices, systems, improvements, methods, processes, applications, computer readable mediums, and other technologies related to any of the above.

BRIEF DESCRIPTION OF THE DRAWINGS

FIGS. 3A-C are DMS tables that illustrate operation of the system of FIGS. 1-2, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
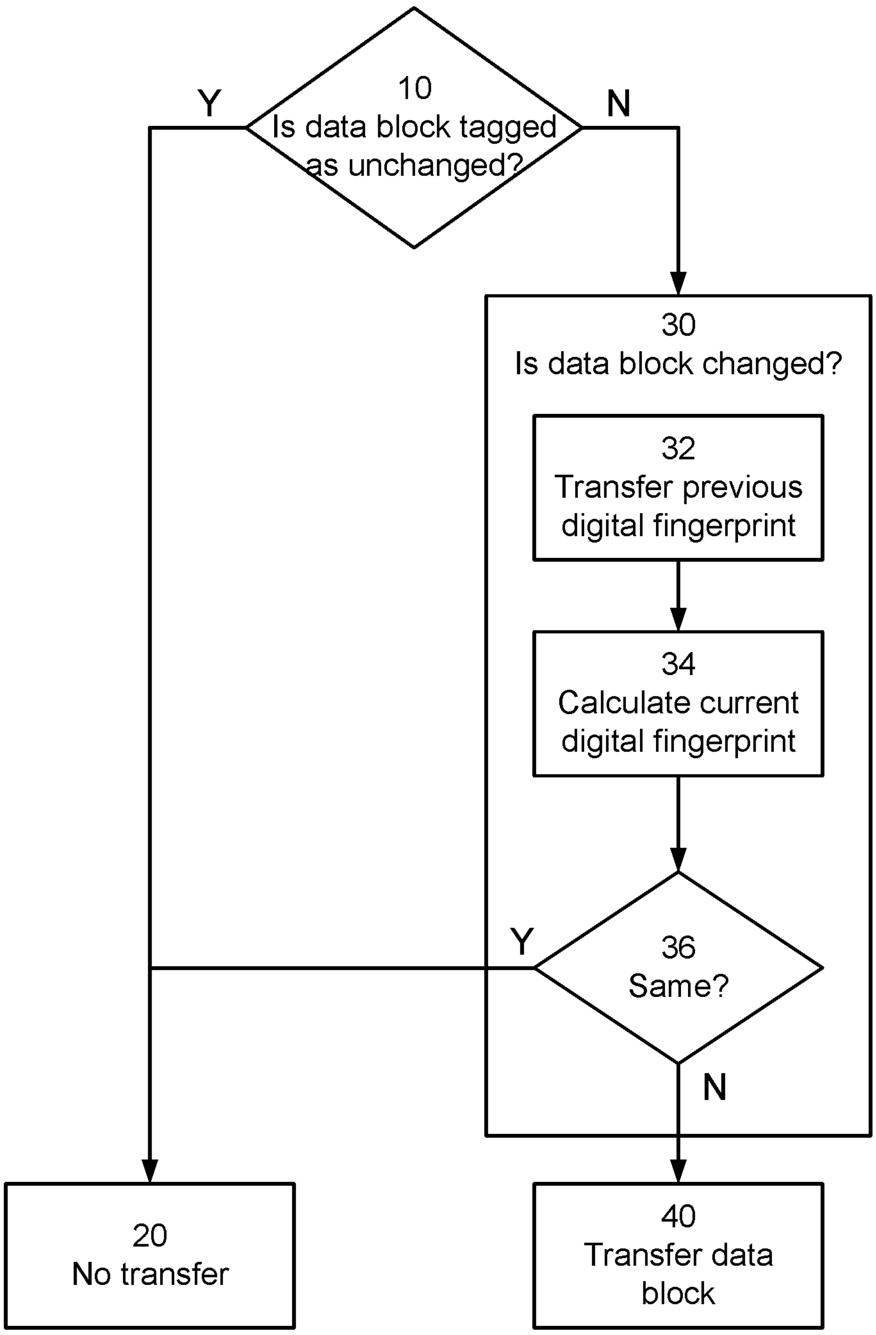
FIG. 1 is a flow diagram illustrating data backup, according to one embodiment.

FIG. 1 is a flow diagram illustrating data backup, according to one embodiment. In this example, a compute infrastructure includes multiple machines which are managed by a data management and storage (DMS) system. The DMS system provides backup services to the compute infrastructure. As part of the backup process, the DMS system pulls an incremental snapshot of a fileset from the compute infrastructure. The snapshot is incremental in that a prior snapshot is already stored in the DMS system, so that only changes from the prior snapshot are stored for the incremental snapshot.

Referring to FIG. 1, certain data blocks are tagged as unchanged. For example, the compute infrastructure may track write accesses to determine that certain data blocks have not been write accessed and therefore are not changed since the last snapshot. The system determines 10 whether a data block in the fileset is currently tagged as unchanged. If a data block is tagged as unchanged, then there is no need to transfer that data block and it is not transferred 20.

If the data block is not tagged and there is uncertainty whether it has changed or not, then it may first undergo a process to determine 30 whether the data block has changed. In the approach shown, a digital fingerprint of the previous snapshot of the data block is transferred 32 from the DMS system to the compute infrastructure. The compute infrastructure calculates 34 the digital fingerprint of the current data block and determines 36 whether the two digital fingerprints are the same. If the two digital fingerprints are the same, then the data block has not changed and it is not transferred 20 to the DMS system for backup, thus saving networking bandwidth. If the two fingerprints are different, then the data block has changed and it is transferred 40 from the compute infrastructure to the DMS system for backup. This can be repeated for all data blocks in the fileset. As an alternative, data blocks that are not tagged as unchanged do not have to undergo the fingerprint process 30. Instead, they could be automatically transferred from the compute infrastructure to the DMS system for backup.

In one approach, tracking which data blocks are unchanged is accomplished by a file system filter running in kernel mode on the compute infrastructure. The filter uses tracking sessions to track changes to a given set of files. There may be more than one active session at any time, so the filter maintains a list of sessions. For each session, the filter maintains a list of the files and a bitmap for each file in the session. Each bit in the bitmap represents a data block in the file and indicates whether that data block has been write accessed. In one implementation, the bitmaps are sparse. They only contain the bits for changed blocks. Unchanged blocks are not tracked. In one approach, the sparse bitmap contains an array of small bitmaps of the same size. A small bitmap is created during runtime based on the block changes. If a block is changed, the corresponding small bitmap will be created and added to the array if it does not exist. When the file system writes to a file, the file system also automatically calls the filter. If the file being write accessed is in any of the active tracking sessions, the filter sets the value of the corresponding bit in the bitmap for that file. When the tracking session ends, the filter provides the tracking data (i.e., the bitmaps) to the DMS system, which uses the tracking data to determine whether to transfer data blocks for backup.

Preferably, the session captures all changes between snapshots. It is better to be overinclusive (i.e., to tag data blocks as possibly changed when they are not) than to be underinclusive (i.e., to tag data blocks as unchanged when they are changed). In one approach that ensures that no changes are missed, each sessions starts before the last snapshot was taken and ends after the next snapshot is taken. In this way, the session covers the entire time period between snapshots and the tracking data includes all changes made during that time period. The tracking data may also include some additional changes that occur before or after that time period, but this approach avoids the difficulty of having to synchronize the sessions exactly with the snapshots. The overinclusion of changes may be addressed by using the fingerprinting process described above.

The file system filter preferably is run in kernel mode. The sessions and bitmaps are stored in kernel space memory in order to reduce the impact on overall performance. If the system reboots or the session information is otherwise lost, it is not a catastrophic failure. The backup can still proceed. Only the efficiency boost from the session information will be lost. For similar reasons, not all files need be tracked. Instead, a subset of the files in the fileset to be backed up may be tracked. In addition, the size of the data blocks represented by each bit may be configurable in some implementations.

Figure 2A:
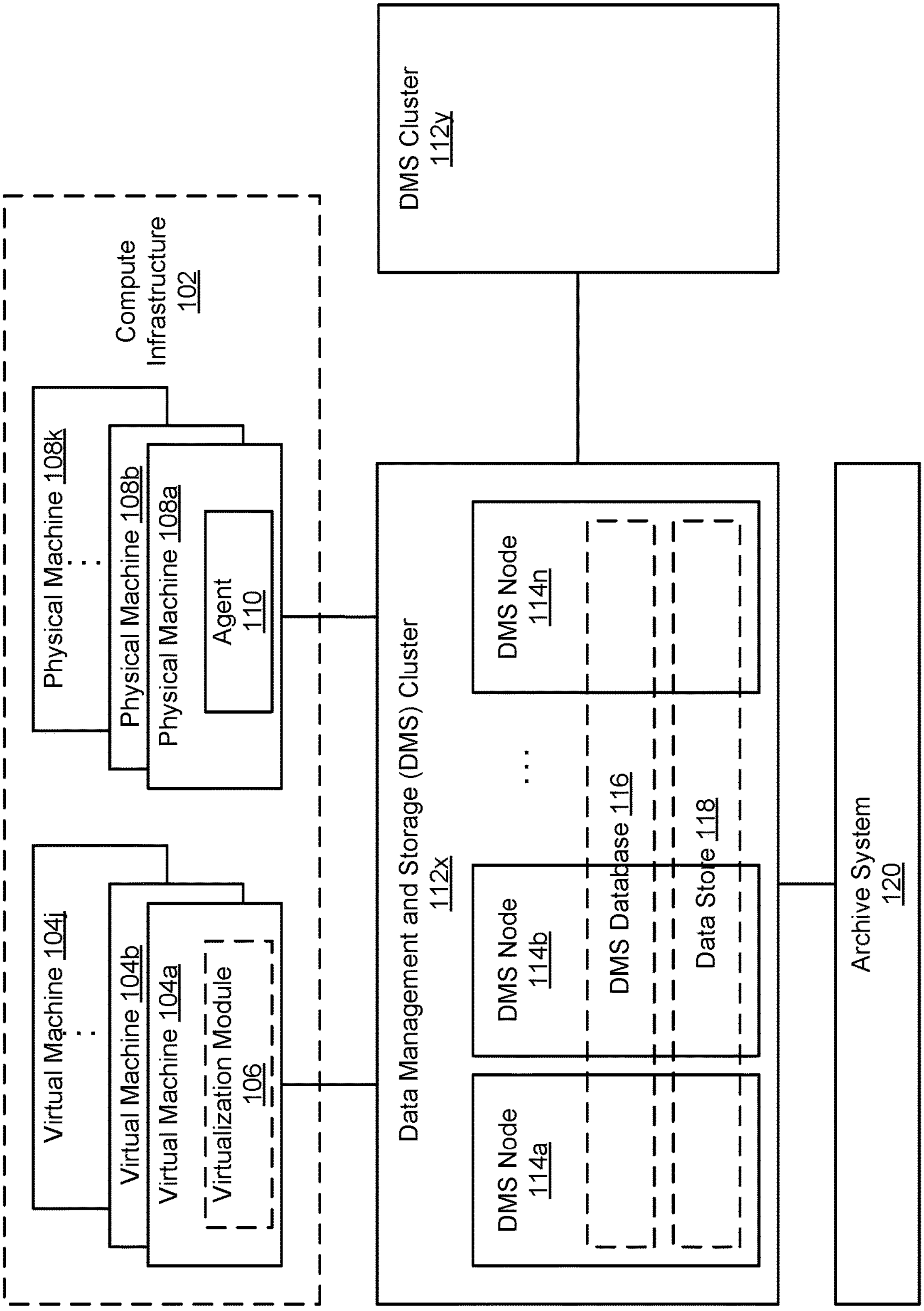
FIG. 2A is a block diagram of a system for managing and storing data, according to one embodiment.

FIGS. 2-3 provide an example DMS system that implements the approach described above. FIG. 2A is a block diagram illustrating a DMS system, according to one embodiment. In this example, the system includes a DMS cluster 112*x*, a secondary DMS cluster 112*y* and an archive system 120. The DMS system provides data management and storage services to a compute infrastructure 102, which may be used by an enterprise such as a corporation, university, or government agency. Many different types of compute infrastructures 102 are possible. Some examples include serving web pages, implementing e-commerce services and marketplaces, and providing compute resources for an enterprise's internal use. Additional examples include web servers (Linux), intranet servers (Linux), Exchange servers (Windows), MS SQL databases (MS SQL), and NAS systems (NFS). The compute infrastructure can include production environments, in addition to development or other environments.

In this example, the compute infrastructure 102 includes both virtual machines (VMs) 104*a-j* and physical machines (PMs) 108*a-k*. The VMs 104 can be based on different protocols. VMware, Microsoft Hyper-V, Microsoft Azure, GCP (Google Cloud Platform), Nutanix AHV, Linux KVM (Kernel-based Virtual Machine), and Xen are some examples. The physical machines 108*a-n* can also use different operating systems running various applications. Microsoft Windows running Microsoft SQL or Oracle databases, and Linux running web servers are some examples.

The DMS cluster 112 manages and stores data for the compute infrastructure 102. This can include the states of machines 104,108, configuration settings of machines 104, 108, network configuration of machines 104,108, and data stored on machines 104,108. Example DMS services includes backup, recovery, replication, archival, and analytics services. The primary DMS cluster 112*x* enables near instant recovery of backup data. Derivative workloads (e.g., estimating the Pr(change) or otherwise determining which data blocks should be tagged for automatic transfer) may also use the DMS clusters 112*x*, 112*y* as a primary storage platform to read and/or modify past versions of data.

In this example, to provide redundancy, two DMS clusters 112*x-y* are used. From time to time, data stored on DMS cluster 112*x* is replicated to DMS cluster 112*y*. If DMS cluster 112*x* fails, the DMS cluster 112*y* can be used to provide DMS services to the compute infrastructure 102 with minimal interruption.

Archive system 120 archives data for the computer infrastructure 102. The archive system 120 may be a cloud service. The archive system 120 receives data to be archived from the DMS clusters 112. The archived storage typically is "cold storage," meaning that more time is required to retrieve data stored in archive system 120. In contrast, the DMS clusters 112 provide much faster backup recovery.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114*a-n* that operate autonomously to collectively provide the DMS services, including managing and storing data. A DMS node 114 includes a software stack, processor and data storage. DMS nodes 114 can be implemented as physical machines and/or as virtual machines. The DMS nodes 114 are interconnected with each other, for example, via cable, fiber, backplane, and/or network switch. The end user does not interact separately with each DMS node 114, but interacts with the DMS nodes 114*a-n* collectively as one entity, namely, the DMS cluster 112.

The DMS nodes 114 are peers and preferably each DMS node 114 includes the same functionality. The DMS cluster 112 automatically configures the DMS nodes 114 as new nodes are added or existing nodes are dropped or fail. For example, the DMS cluster 112 automatically discovers new nodes. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, such as the tags for automatic transfer, as will be described in more detail in FIG. 2. In the following examples, these are shown as tables but other data structures could also be used. The data store 118 contains the actual backup data from the compute infrastructure 102, for example the data blocks for snapshots of VMs or application files. Both the DMS database 116 and the data store 118 are distributed across the nodes 114, for example using Apache Cassandra. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 has a similar structure, although data in the data store may or may not be stored redundantly. Accordingly, if any DMS node 114 fails, the full DMS database 116 and the full functionality of the DMS cluster 112 will still be available from the remaining DMS nodes. As a result, the DMS services can still be provided.

Considering each of the other components shown in FIG. 1, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104. An agent could also be installed to facilitate DMS services for the virtual machines 104.

A physical machine 108 is a physical computing system that allows execution of operating systems as well as software applications such as a database application or a web server. In the following example, a DMS agent 110 is installed on the physical machines 108 to facilitate DMS services for the physical machines. DMS agents 110 may also be installed on VMs 104, but for convenience they are not shown in the figures.

Figure 2B:
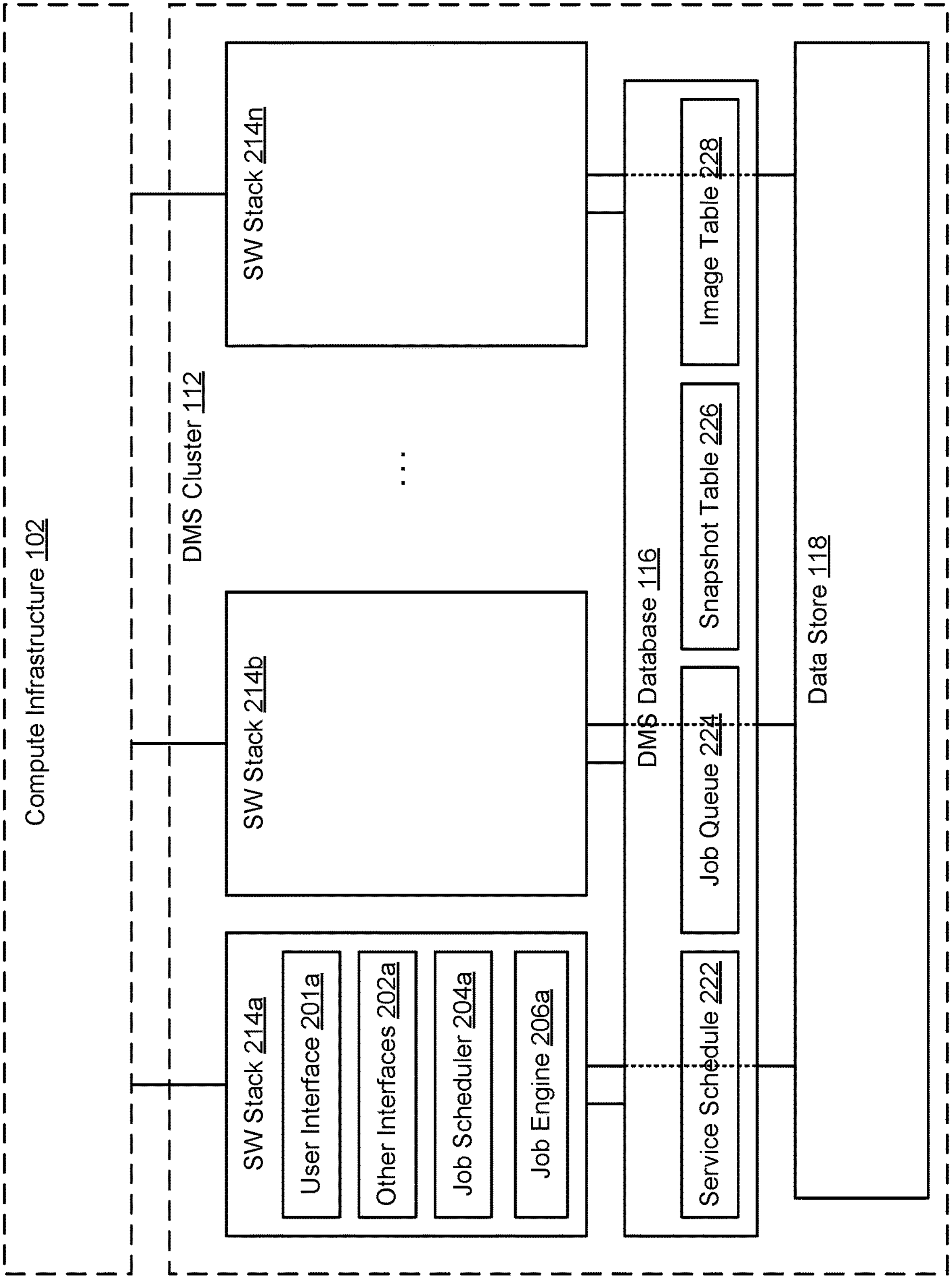
FIG. 2B is a logical block diagram of a data management and storage (DMS) cluster, according to one embodiment.

FIG. 2B is a logical block diagram illustrating an example DMS cluster 112, according to one embodiment. This logical view shows the software stack 214*a-n* for each of the DMS nodes 114*a-n* of FIG. 2A. Also shown are the DMS database 116 and data store 118, which are distributed across the DMS nodes 114*a-n*. Preferably, the software stack 214 for each DMS node 114 is the same. This stack 214*a* is shown only for node 114*a* in FIG. 2. The stack 214*a* includes a user interface 201*a*, other interfaces 202*a*, job scheduler 204*a* and job engine 206*a*. This stack is replicated on each of the software stacks 214*b-n* for the other DMS nodes. The DMS database 116 includes the following data structures: a service schedule 222, a job queue 224, a snapshot table 226 and an image table 228. In the following examples, these are shown as tables but other data structures could also be used.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2, this information is stored in the service schedule 222. The user interface 201 can also be used to allow the user to run diagnostics, generate reports or calculate analytics.

The software stack 214 also includes other interfaces 202. For example, there is an interface 202 to the computer infrastructure 102, through which the DMS nodes 114 may make requests to the virtualization module 106 and/or the DMS agent 110. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112*y* and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), archive, etc. Some of these jobs are determined according to the service schedule 222. For example, if a certain machine is to be backed up every 6 hours, then a job scheduler will post a "pull snapshot" job into the job queue 224 at the appropriate 6-hour intervals. Other jobs, such as internal trash collection or updating of incremental backups, are generated according to the DMS cluster's operation separate from the service schedule 222.

The job schedulers 204 preferably are decentralized and execute without a master. The overall job scheduling function for the DMS cluster 112 is executed by the multiple job schedulers 204 running on different DMS nodes. Preferably, each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution.

The job engines 206 process the jobs in the job queue 224. When a DMS node is ready for a new job, it pulls a job from the job queue 224, which is then executed by the job engine 206. Preferably, the job engines 206 all have access to the entire job queue 224 and operate autonomously. Thus, a job scheduler 204*j* from one node might post a job, which is then pulled from the queue and executed by a job engine 206*k* from a different node.

In some cases, a specific job is assigned to or has preference for a particular DMS node (or group of nodes) to execute. For example, if a snapshot for a VM is stored in the section of the data store 118 implemented on a particular node 114*x*, then it may be advantageous for the job engine 206*x* on that node to pull the next snapshot of the VM if that process includes comparing the two snapshots. As another example, if the previous snapshot is stored redundantly on three different nodes, then the preference may be for any of those three nodes.

The snapshot table 226 and image table 228 are data structures that index the snapshots captured by the DMS cluster 112. In this example, snapshots are decomposed into images, which are stored in the data store 118. The snapshot table 226 describes which images make up each snapshot. For example, the snapshot of machine x taken at time y can be constructed from the images a,b,c. The image table is an index of images to their location in the data store 118. For example, image a is stored at location aaa of the data store 118, image b is stored at location bbb, etc. More details of example implementations are provided in FIG. 3 below.

DMS database 116 also stores metadata information for the data in the data store 118. The metadata information may include file names, file sizes, permissions for files, and various times such as when the file was created or last modified.

FIG. 3 illustrate operation of the DMS system shown in FIG. 2. FIG. 3A is an example of a service schedule 222. The service schedule defines which services should be performed on what machines at what time. It can be set up by the user via the user interface, automatically generated, or even populated through a discovery process. In this example, each row of the service schedule 222 defines the services for a particular machine. The machine is identified by machine user id, which is the ID of the machine in the compute infrastructure. It points to the location of the machine in the user space, so that the DMS cluster can find the machine in the compute infrastructure. In this example, there is a mix of virtual machines (VMxx) and physical machines (PMxx). The machines are also identified by machine_id, which is a unique ID used internally by the DM cluster.

The services to be performed are defined in the SLA (service level agreement) column. Here, the different SLAs are identified by text: standard VM is standard service for virtual machines. Each SLA includes a set of DMS policies (e.g., a backup policy, a replication policy, or an archival policy) that define the services for that SLA. For example, "standard VM" might include the following policies:

Backup policy: The following backups must be available on the primary DMS cluster 112$x$: every 6 hours for the prior 2 days, every 1 day for the prior 30 days, every 1 month for the prior 12 months.

Replication policy: The backups on the primary DMS cluster for the prior 7 days must also be replicated on the secondary DMS cluster 112$y$.

Archive policy: Backups that are more than 30 days old may be moved to the archive system 120.

The underlines indicate quantities that are most likely to vary in defining different levels of service. For example, "high frequency" service may include more frequent backups than standard. For "short life" service, backups are not kept for as long as standard.

From the service schedule 222, the job schedulers 204 populate the job queue 224. FIG. 3B is an example of a job queue 224. Each row is a separate job. job_id identifies a job and start time is the scheduled start time for the job. job_type defines the job to be performed and job_info includes additional information for the job. Job 00001 is a job to "pull snapshot" (i.e., take backup) of machine m001. Job 00003 is a job to replicate the backup for machine m003 to the secondary DMS cluster. Job 00004 runs analytics on the backup for machine m002. Job 00005 is an internal trash collection job. The jobs in queue 224 are accessible by any of the job engines 206, although some may be assigned or preferred to specific DMS nodes.

FIG. 3C are examples of a snapshot table 226 and image table 228, illustrating a series of backups for a machine m001. Each row of the snapshot table is a different snapshot and each row of the image table is a different image. The snapshot is whatever is being backed up at that point in time. In the nomenclature of FIG. 3C, m001.ss1 is a snapshot of machine m001 taken at time t1. In the suffix ".ss1", the .ss indicates this is a snapshot and the 1 indicates the time t1. m001.ss2 is a snapshot of machine m001 taken at time t2, and so on. Images are what is saved in the data store 118. For example, the snapshot m001.ss2 taken at time t2 may not be saved as a full backup. Rather, it may be composed of a full backup of snapshot m001.ss1 taken at time t1 plus the incremental difference between the snapshots at times t1 and t2. The full backup of snapshot m001.ss1 is denoted as m001.im1, where ".im" indicates this is an image and "1" indicates this is a full image of the snapshot at time t1. The incremental difference is m001.im1-2 where "1-2" indicates this is an incremental image of the difference between snapshot m001.ss1 and snapshot m001.ss2.

In this example, the service schedule indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 226 and image table 228. In the snapshot table 226, the ss_id is the snapshot ID which is m001.ss1. The ss time is a timestamp of the snapshot, which is Oct. 1, 2017 at 3 am. im_list is the list of images used to compose the snapshot. Because this is the first snapshot taken, a full image of the snapshot is saved (m001.im1). The image table 228 shows where this image is saved in the data store 118.

On Oct. 1, 2017 at 9 am (time t2), a second backup of machine m001 is made. This results in the second row of the snapshot table for snapshot m001 ss2. The image list of this snapshot is m001.im1 and m001.im1-2. That is, the snapshot m001 ss2 is composed of the base full image m001.im1 combined with the incremental image m001.im1-2. The new incremental image m001.im1-2 is stored in data store 118, with a corresponding entry in the image table 228. This process continues every 6 hours as additional snapshots are made.

In FIG. 3C, the snapshots and images are each represented by a single name: m001.ss1, m001.im1-2, etc. Each of these is composed of data blocks. The incremental image m001.im1-2 is constructed by comparing corresponding data blocks of snapshots m001.ss1 and m001 ss2. However, the data blocks for the previous snapshot m001.ss1 are stored in the data store 118 while the data blocks for the current snapshot exist in the compute infrastructure 102. In order to compare data blocks, either the m001.ss1 data blocks are transferred to the compute infrastructure 102 or the m001 ss2 data blocks are transferred to the DMS cluster 112. The latter is preferred because the DMS cluster's primary purpose is to provide DMS services and because any resulting incremental images will be stored at the DMS cluster. In addition, because the compute infrastructure 102 serves some other primary purpose, it is preferred to reduce the burden on the compute infrastructure 102. However, transferring all the data blocks from the compute infrastructure 102 to the DMS cluster 112 is an inefficient use of network bandwidth if not all of the data blocks have changed. Hence, the approach described above may be applied to both reduce the bandwidth used to transfer data blocks from the compute infrastructure 102 to the DMS cluster 112 and to reduce the computing power used at the compute infrastructure 102 to calculate digital fingerprints.

Figure 4:
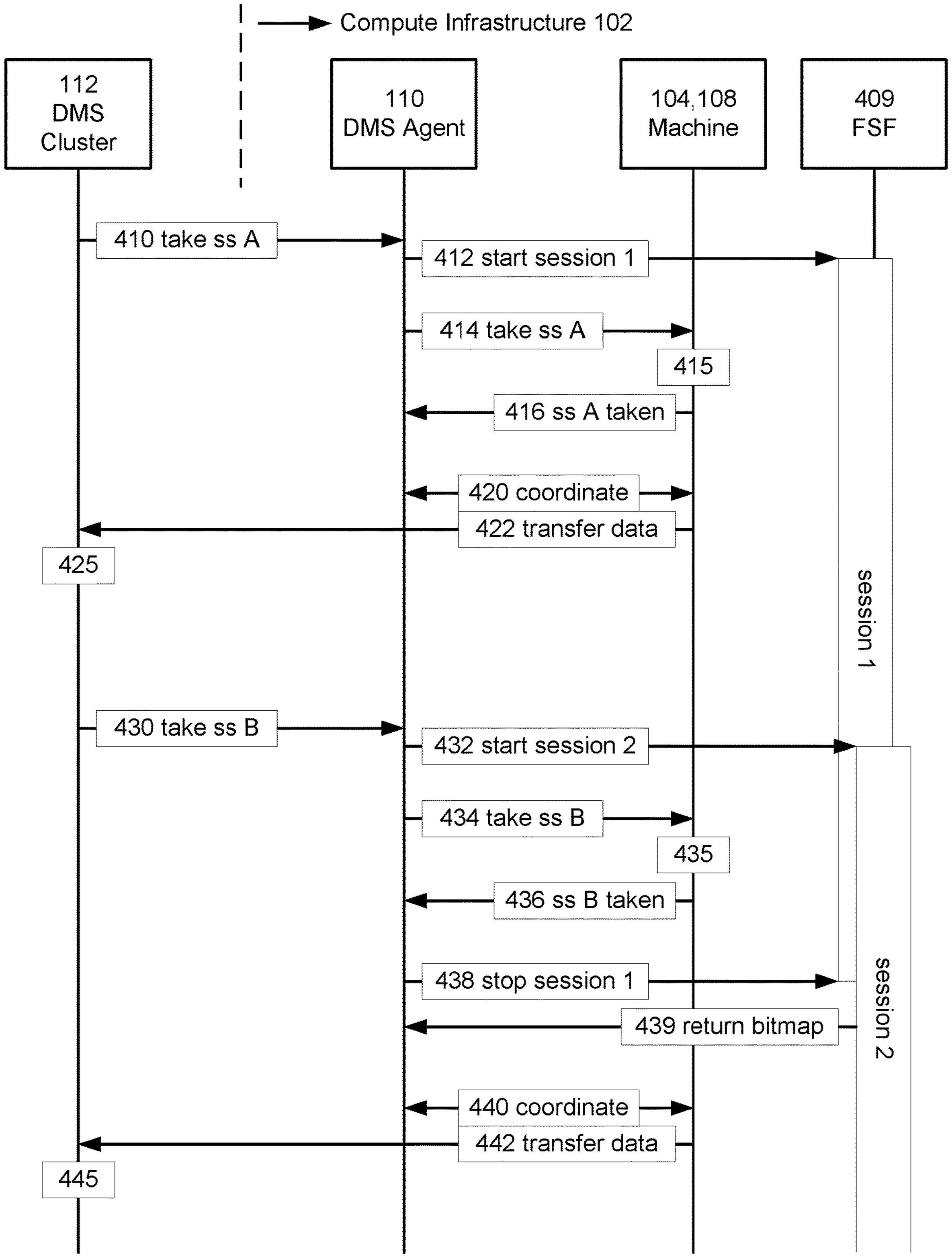
FIG. 4 is an event trace illustrating data backup, according to one embodiment.

FIG. 4 is an event trace illustrating data backup, according to one embodiment. This example uses the file system filter described in FIG. 1B above. In FIG. 4, each box at the top of the figure represents a component from FIG. 2: the DMS cluster 112, the various machines 104,108, the DMS agent 110 running in user mode, and the file system filter 409 running in kernel mode. These last three components are parts of the compute infrastructure 102. The vertical lines extending downward from each box represent that component's activities over time, with time moving forward from the top to the bottom of the figure.

FIG. 4 begins with the DMS cluster 112 (e.g., one of the job engines) instructing 410 the DMS agent 110 to take a snapshot of the fileset of interest. This snapshot will be referred to as snapshot A. The DMS agent 110 will do this by instructing 414 the machines 104,108 to take snapshots, for example by using file system snapshots. However, before doing so, the DMS agent 110 starts 412 tracking session 1 for the file system filter 409. The DMS cluster 112 maintains the metadata for each database to backup and the DMS agent 110 gets the file information for session 1 from the DMS cluster 112. The machines 104,108 take 415 snapshot A of the fileset after tracking session 1 has started. The DMS agent 110 is notified 416 of snapshot A. It then coordinates 420 the transfer 422 of data blocks of snapshot A from the compute infrastructure 102 to the DMS cluster 112 for backup. The transfer process 420,422 may use the techniques described in FIGS. 1A-1C. For clarity, details of the transfer have been omitted. The DMS cluster 112 updates 425 the backup using the received data blocks, as described in FIGS. 2-3 above.

At a later time, the DMS cluster instructs 430 the DMS agent 110 to take the next snapshot of the fileset of interest, labelled snapshot B in this example. The DMS agent 110 starts 432 tracking session 2 for the file system filter 409. Note that the file system filter may have multiple sessions running simultaneously. Thus, when a file is write accessed, the file system filter checks against all active sessions. Writing to one data block may affect more than one session. The machines 104,108 take 434,435,436 snapshot B of the fileset after tracking session 2 has started. The DMS agent 110 stops 438 session 1 after the snapshot B has been taken. Note that session 1 began before snapshot A (step 416) and ends after snapshot B (step 436). In this way, the tracking data from session 1 will capture all changes that occur between the two snapshots.

The file system filter 409 transfers 439 the tracking data from session 1 to the DMS agent 110. The DMS agent 110 then coordinates 440 the transfer 442 of data blocks of snapshot B from the compute infrastructure 102 to the DMS cluster 112 for backup. In particular, the DMS agent 110 uses the tracking data from session 1 to determine which data blocks are tagged as unchanged. Those data blocks are not transferred. The remaining data blocks may be automatically transferred, or the fingerprint process described above may be used. In the fingerprint process, the fingerprints are transferred from the DMS cluster 112 to the compute infrastructure 102, where the fingerprint comparison is made. The DMS cluster 112 updates 445 the backup.

Figure 5:
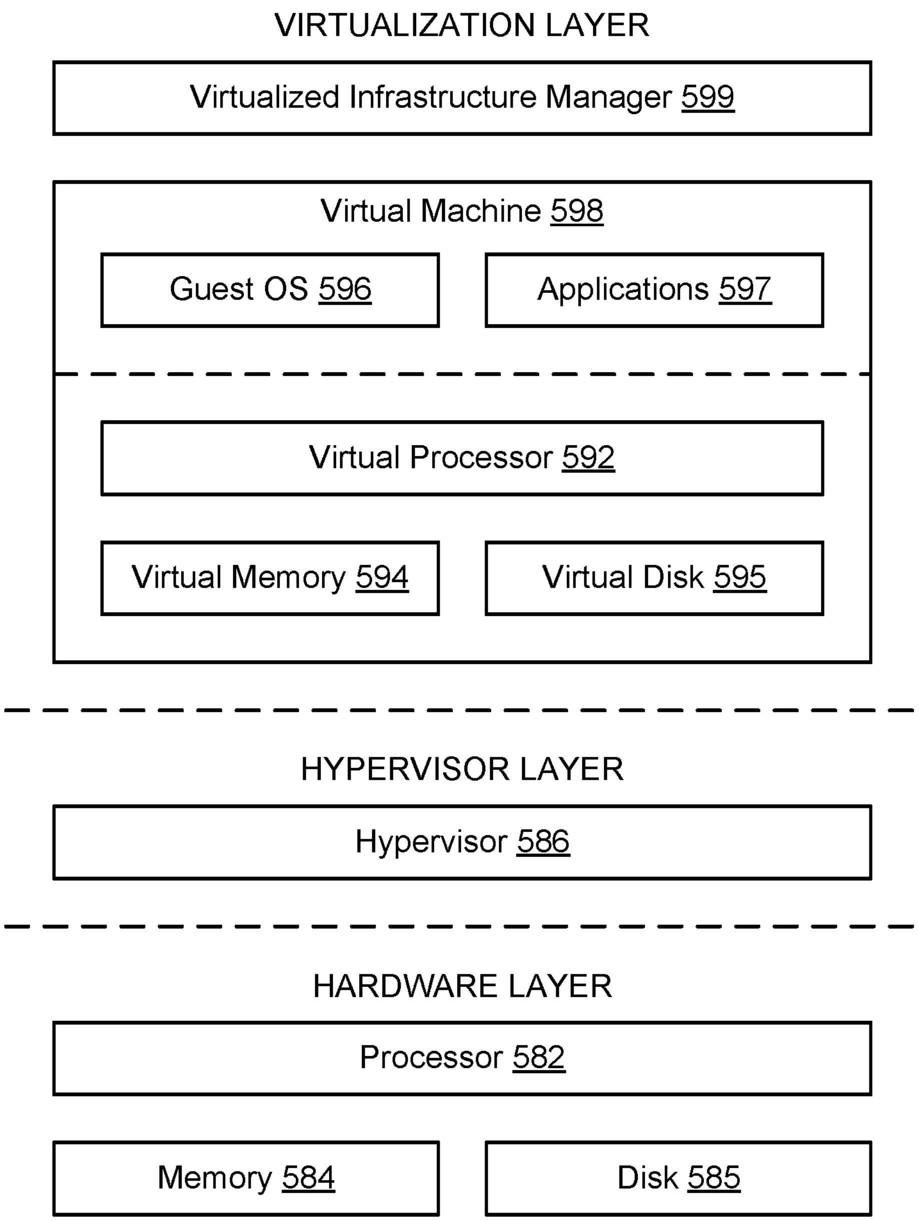
FIG. 5 is a block diagram of a virtual machine, according to one embodiment.

FIG. 5 is a block diagram of a server for a VM platform, according to one embodiment. The server includes hardware-level components and software-level components. The hardware-level components include one or more processors 582, one or more memory 584, and one or more storage devices 585. The software-level components include a hypervisor 586, a virtualized infrastructure manager 599, and one or more virtual machines 598. The hypervisor 586 may be a native hypervisor or a hosted hypervisor. The hypervisor 586 may provide a virtual operating platform for running one or more virtual machines 598. Virtual machine 598 includes a virtual processor 592, a virtual memory 594, and a virtual disk 595. The virtual disk 595 may comprise a file stored within the physical disks 585. In one example, a virtual machine may include multiple virtual disks, with each virtual disk associated with a different file stored on the physical disks 585. Virtual machine 598 may include a guest operating system 596 that runs one or more applications, such as application 597. Different virtual machines may run different operating systems. The virtual machine 598 may load and execute an operating system 596 and applications 597 from the virtual memory 594. The operating system 596 and applications 597 used by the virtual machine 598 may be stored using the virtual disk 595. The virtual machine 598 may be stored as a set of files including (a) a virtual disk file for storing the contents of a virtual disk and (b) a virtual machine configuration file for storing configuration settings for the virtual machine. The configuration settings may include the number of virtual processors 592 (e.g., four virtual CPUs), the size of a virtual memory 594, and the size of a virtual disk 595 (e.g., a 10 GB virtual disk) for the virtual machine 595.

The virtualized infrastructure manager 599 may run on a virtual machine or natively on the server. The virtualized infrastructure manager 599 corresponds to the virtualization module 106 above and may provide a centralized platform for managing a virtualized infrastructure that includes a plurality of virtual machines. The virtualized infrastructure manager 599 may manage the provisioning of virtual machines running within the virtualized infrastructure and provide an interface to computing devices interacting with the virtualized infrastructure. The virtualized infrastructure manager 599 may perform various virtualized infrastructure related tasks, such as cloning virtual machines, creating new virtual machines, monitoring the state of virtual machines, and facilitating backups of virtual machines.

For virtual machines, taking a snapshot for the VM typically includes the following steps: freezing the VM and taking a snapshot of the VM, transferring the snapshot (or the incremental differences) and releasing the VM. For example, the DMS cluster may receive a virtual disk file that includes the snapshot of the VM. The backup process may also include deduplication, compression/decompression and/or encryption/decryption.

Figure 6:
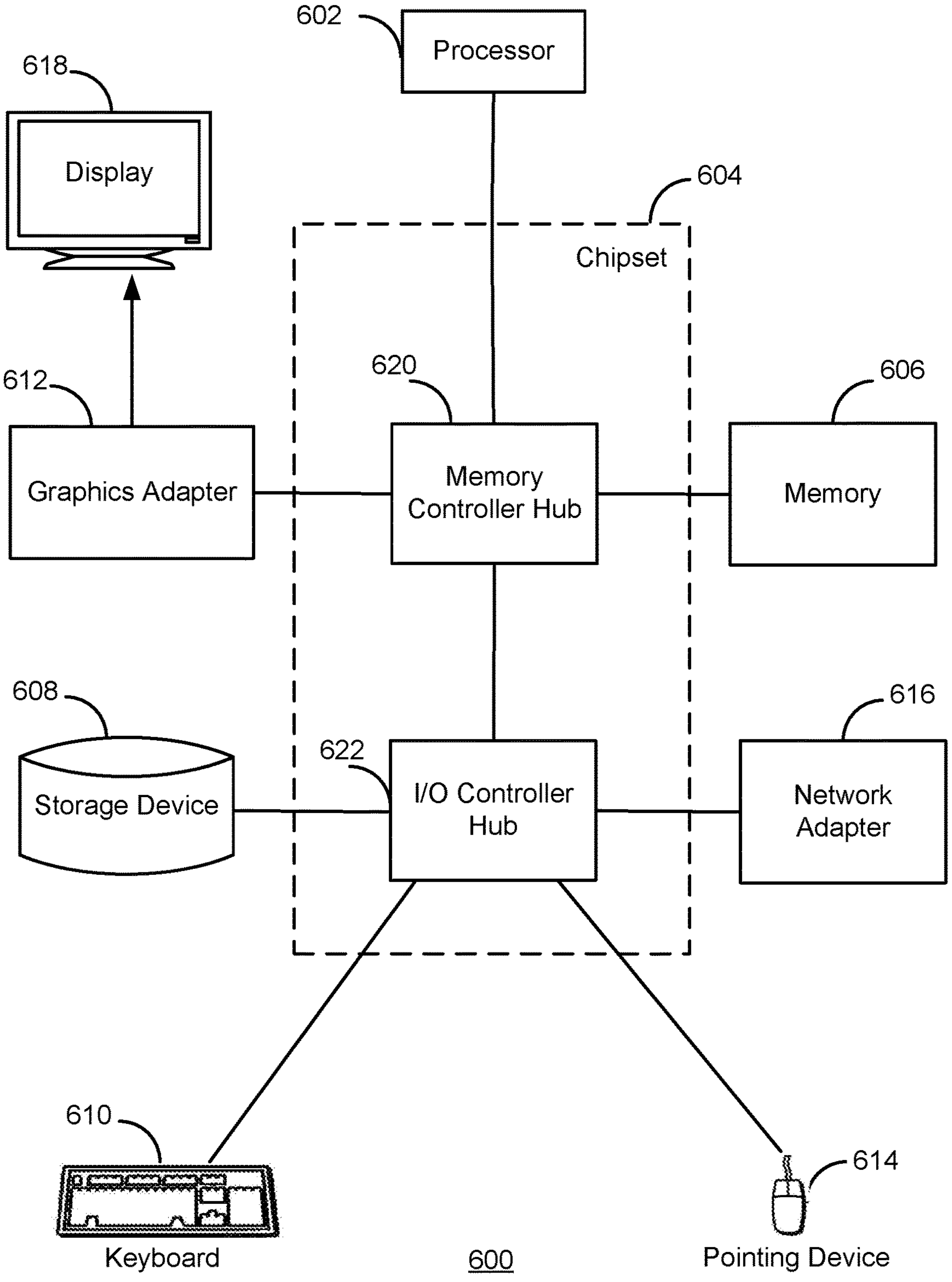
FIG. 6 is a block diagram of a computer system suitable for use in a DMS system, according to one embodiment.

FIG. 6 is a high-level block diagram illustrating an example of a computer system 600 for use as one or more of the components shown above, according to one embodiment. Illustrated are at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display device 618 is coupled to the graphics adapter 612. A storage device 608, keyboard 610, pointing device 614, and network adapter 616 are coupled to the I/O controller hub 622. Other embodiments of the computer 600 have different architectures. For example, the memory 606 is directly coupled to the processor 602 in some embodiments.

The storage device 608 includes one or more non-transitory computer-readable storage media such as a hard drive, compact disk read-only memory (CD-ROM), DVD, or a solid-state memory device. The memory 606 holds instructions and data used by the processor 602. The pointing device 614 is used in combination with the keyboard 610 to input data into the computer system 600. The graphics adapter 612 displays images and other information on the display device 618. In some embodiments, the display device 618 includes a touch screen capability for receiving user input and selections. The network adapter 616 couples the computer system 600 to a network. Some embodiments of the computer 600 have different and/or other components than those shown in FIG. 6. For example, the virtual machine 102, the physical machine 104, and/or the DMS node 114 in FIG. 2 can be formed of multiple blade servers and lack a display device, keyboard, and other components.

The computer 600 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 608, loaded into the memory 606, and executed by the processor 602.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method, comprising:

instructing, by a data management system (DMS) agent at a compute infrastructure to facilitate a DMS service, the compute infrastructure to initiate a tracking session to generate tracking data associated with data blocks of a machine, wherein the tracking data indicates one or more data blocks that are write accessed during the tracking session;

instructing, by the DMS agent, the compute infrastructure to take a first snapshot of the machine of the compute infrastructure after initiating the tracking session;

instructing, by the DMS agent, the compute infrastructure to take a second snapshot of the machine of the compute infrastructure after the first snapshot of the machine;

determining, by the DMS agent, a subset of data blocks of the machine to transfer to a DMS for backup of the second snapshot based at least in part on the tracking data generated during the tracking session, wherein the tracking data indicates that the subset of data blocks were write accessed during the tracking session;

instructing, by the DMS agent, the compute infrastructure to end the tracking session in response to the compute infrastructure taking the second snapshot; and causing, by the DMS agent, the transfer of the subset of data blocks to the DMS from the compute infrastructure based at least in part on the determination.

2. The method of claim 1, wherein determining, by the DMS agent, the subset of data blocks to transfer to the DMS comprises:

determining that data blocks of the subset of data blocks were write accessed during the tracking session based at least in part on the tracking data, wherein the subset of data blocks are transferred based at least in part on being write accessed during the tracking session.

3. The method of claim 1, wherein determining, by the DMS agent, the subset of data blocks to transfer to the DMS comprises:

determining that data blocks of the subset of data blocks were write accessed during the tracking session based at least in part on the tracking data;

causing a transfer of respective first digital fingerprints of the data blocks associated with the first snapshot to the compute infrastructure; and instructing the compute infrastructure to determine whether the respective first digital fingerprints and respective current digital fingerprints of the data blocks are same, wherein the subset of data blocks are transferred from the compute infrastructure to the DMS based at least in part on the respective first digital fingerprints and respective current digital fingerprints being different.

4. The method of claim 1, further comprising:

determining a second subset of data blocks of the machine to refrain from transferring to the DMS as part of the backup of the second snapshot based at least in part on the tracking data, wherein transferring the subset of data blocks to the DMS excludes the second subset of data blocks based at least in part on determining the second subset of data blocks.

5. The method of claim 4, wherein determining the second subset of data blocks comprises:

determining that the second subset of data blocks are tagged as unchanged based at least in part on the tracking data.

6. The method of claim 4, wherein determining the second subset of data blocks comprises:

determining that data blocks of the second subset of data blocks were write accessed during the tracking session based at least in part on the tracking data;

causing a transfer of respective first digital fingerprints of the data blocks associated with the first snapshot to the compute infrastructure;

instructing the compute infrastructure to determine whether the respective first digital fingerprints and respective current digital fingerprints of the data blocks are same; and refraining from transferring the second subset of data blocks from the compute infrastructure to the DMS based at least in part on the respective first digital fingerprints and respective current digital fingerprints being same.

7. The method of claim 1, further comprising:

receiving, at the DMS, the tracking data from a file system filter of the compute infrastructure in response to the compute infrastructure taking the second snapshot.

8. The method of claim 1, wherein:

the DMS comprises the DMS agent at the compute infrastructure and a DMS cluster, and the DMS agent coordinates the transfer of the subset of data blocks to the DMS cluster based at least in part on the tracking data.

9. The method of claim 8, further comprising:

instructing the DMS agent to begin the tracking session based at least in part on the first snapshot.

10. The method of claim 8, further comprising:

instructing the DMS agent to begin a second tracking session based at least in part on the compute infrastructure taking the second snapshot.

11. The method of claim 8, wherein the DMS agent receives the tracking data and determines the subset of data blocks to transfer to the DMS cluster based at least in part on the tracking data.

12. An apparatus, comprising:

at least one processor;

memory coupled with the at least one processor; and instructions stored in the memory and executable by the at least one processor to cause the apparatus to:

instruct, by a data management system (DMS) agent at a compute infrastructure to facilitate a DMS service, the compute infrastructure to initiate a tracking session to generate tracking data associated with data blocks of a machine, wherein the tracking data indicates one or more data blocks that are write accessed during the tracking session;

instruct, by the DMS agent, the compute infrastructure to take a first snapshot of the machine of the compute infrastructure after initiating the tracking session;

instruct, by the DMS agent, the compute infrastructure to take a second snapshot of the machine of the compute infrastructure after the first snapshot of the machine;

determine, by the DMS agent, a subset of data blocks of the machine to transfer to a DMS for backup of the second snapshot based at least in part on the tracking data generated during the tracking session, wherein the tracking data indicates that the subset of data blocks were write accessed during the tracking session;

instruct, by the DMS agent, the compute infrastructure to end the tracking session in response to the compute infrastructure taking the second snapshot; and cause, by the DMS agent, the transfer of the subset of data blocks to the DMS from the compute infrastructure based at least in part on the determination.

13. The apparatus of claim 12, wherein the instructions to determine, by the DMS agent, the subset of data blocks to transfer to the DMS are executable by the at least one processor to cause the apparatus to:

determine that data blocks of the subset of data blocks were write accessed during the tracking session based at least in part on the tracking data, wherein the subset of data blocks are transferred based at least in part on being write accessed during the tracking session.

14. The apparatus of claim 12, wherein the instructions to determine, by the DMS agent, the subset of data blocks to transfer to the DMS are executable by the at least one processor to cause the apparatus to:

determine that data blocks of the subset of data blocks were write accessed during the tracking session based at least in part on the tracking data;

cause a transfer of respective first digital fingerprints of the data blocks associated with the first snapshot to the compute infrastructure; and instruct the compute infrastructure to determine whether the respective first digital fingerprints and respective current digital fingerprints of the data blocks are same, wherein the subset of data blocks are transferred from the compute infrastructure to the DMS based at least in part on the respective first digital fingerprints and respective current digital fingerprints being different.

15. The apparatus of claim 12, wherein the instructions are further executable by the at least one processor to cause the apparatus to:

determine a second subset of data blocks of the machine to refrain from transferring to the DMS as part of the backup of the second snapshot based at least in part on the tracking data, wherein transferring the subset of data blocks to the DMS excludes the second subset of data blocks based at least in part on determining the second subset of data blocks.

16. The apparatus of claim 15, wherein the instructions to determine the second subset of data blocks are executable by the at least one processor to cause the apparatus to:

determine that the second subset of data blocks are tagged as unchanged based at least in part on the tracking data.

17. The apparatus of claim 15, wherein the instructions to determine the second subset of data blocks are executable by the at least one processor to cause the apparatus to:

determine that data blocks of the second subset of data blocks were write accessed during the tracking session based at least in part on the tracking data;

cause a transfer of respective first digital fingerprints of the data blocks associated with the first snapshot to the compute infrastructure;

instruct the compute infrastructure to determine whether the respective first digital fingerprints and respective current digital fingerprints of the data blocks are same; and refrain from transferring the second subset of data blocks from the compute infrastructure to the DMS based at least in part on the respective first digital fingerprints and respective current digital fingerprints being same.

18. The apparatus of claim 12, wherein the instructions are further executable by the at least one processor to cause the apparatus to:

receive, at the DMS, the tracking data from a file system filter of the compute infrastructure in response to the compute infrastructure taking the second snapshot.

19. The apparatus of claim 12, wherein:

the DMS comprises the DMS agent at the compute infrastructure and a DMS cluster, and the DMS agent coordinates the transfer of the subset of data blocks to the DMS cluster based at least in part on the tracking data.

20. A non-transitory computer-readable medium storing code, the code comprising instructions executable by at least one processor to:

instruct, by a data management system (DMS) agent at a compute infrastructure to facilitate a DMS service, the compute infrastructure to initiate a tracking session to generate tracking data associated with data blocks of a machine, wherein the tracking data indicates one or more data blocks that are write accessed during the tracking session;

instruct, by the DMS agent, the compute infrastructure to take a first snapshot of the machine of the compute infrastructure after initiating the tracking session;

instruct, by the DMS agent, the compute infrastructure to take a second snapshot of the machine of the compute infrastructure after the first snapshot of the machine;

determine, by the DMS agent, a subset of data blocks of the machine to transfer to a DMS for backup of the second snapshot based at least in part on the tracking data generated during the tracking session, wherein the tracking data indicates that the subset of data blocks were write accessed during the tracking session;

instruct, by the DMS agent, the compute infrastructure to end the tracking session in response to the compute infrastructure taking the second snapshot; and cause, by the DMS agent, the transfer of the subset of data blocks to the DMS from the compute infrastructure based at least in part on the determination.

* * * * *